US011455182B2

(12) United States Patent
Banerjee et al.

(10) Patent No.: US 11,455,182 B2
(45) Date of Patent: *Sep. 27, 2022

(54) IN-PLACE ENCRYPTION OF A SWAP FILE ON A HOST MACHINE

(71) Applicant: VMware, Inc., Palo Alto, CA (US)

(72) Inventors: Ishan Banerjee, Santa Clara, CA (US); Preeti Agarwal, San Jose, CA (US); Valeriy Zhuravlev, San Carlos, CA (US); Nick M Ryan, Sunnyvale, CA (US); Mohammed Junaid Ahmed, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 655 days.

This patent is subject to a terminal disclaimer.

(21) Appl. No.: 16/403,033

(22) Filed: May 3, 2019

(65) Prior Publication Data

US 2020/0348954 A1 Nov. 5, 2020

(51) Int. Cl.
*G06F 9/455* (2018.01)
*G06F 12/1009* (2016.01)
*G06F 21/62* (2013.01)

(52) U.S. Cl.
CPC ...... *G06F 9/45545* (2013.01); *G06F 9/45558* (2013.01); *G06F 12/1009* (2013.01); *G06F 21/6209* (2013.01); *G06F 2009/45562* (2013.01); *G06F 2009/45583* (2013.01); *G06F 2221/2107* (2013.01)

(58) Field of Classification Search
CPC ............ G06F 9/45545; G06F 9/45558; G06F 12/1009; G06F 21/6209
See application file for complete search history.

(56) References Cited

U.S. PATENT DOCUMENTS

| 7,428,636 | B1 | 9/2008 | Waldspurger et al. |
| 11,200,090 | B2 * | 12/2021 | Tsirkin .................... G06F 9/455 |
| 11,216,570 | B2 * | 1/2022 | Prokop ................. G06F 21/602 |
| 2007/0294496 | A1 * | 12/2007 | Goss ................... H04W 12/102 |
| | | | 711/163 |
| 2009/0310242 | A1 | 12/2009 | McLeod et al. |
| 2010/0023565 | A1 * | 1/2010 | Colbert ............... G06F 9/45558 |
| | | | 718/1 |
| 2014/0164791 | A1 * | 6/2014 | Chaturvedi ............ G06F 21/53 |
| | | | 713/193 |
| 2017/0206175 | A1 * | 7/2017 | Sliwa .................. G06F 12/1408 |
| 2017/0300241 | A1 * | 10/2017 | Jagadeesh ............. G06F 3/0623 |

OTHER PUBLICATIONS

Djoko et al. (TPRIVEXEC: Private Execution in Virtual Memory, CODASPY'16, Mar. 9-11, 2016, 10 pages) (Year: 2016).*
Non-Final Office Action issued in Related U.S. Appl. No. 16/402,430 dated Apr. 29, 2022, 15 pages.
Final Office Action issued in Related U.S. Appl. No. 16/402,430 dated Aug. 11, 2022, 19 pages.

* cited by examiner

*Primary Examiner* — Oleg Korsak

(57) ABSTRACT

Systems and methods are described for encrypting a swap file in a computer system. The swap file can be encrypted by a background process executing on the computer system. Processing of paging swapping operations occurs independently and separately of the background encryption of the swap file. Processing a page swapping operation can include decrypting or encrypting data to be swapped involved in the paging operation depending on the paging operation and whether or not the data to be swapped is encrypted or not.

18 Claims, 10 Drawing Sheets page in page out

IN-PLACE ENCRYPTION OF A SWAP FILE ON A HOST MACHINE

CROSS REFERENCE TO RELATED APPLICATIONS

This application is related to U.S. application. Ser. No. 16/402,430 filed May 3, 2019, entitled "In-Place Guest-Agnostic Encryption Of A Running Virtual Machine," the content of which is incorporated herein by reference in its entirety for all purposes.

BACKGROUND

Virtual machine (VM) security is an important topic, and one of the most effective ways of securing a VM is encryption of VM data. A comprehensive VM encryption solution would include encrypting all VM files that reside on storage especially VM disks, but also memory files, swap files, and so on. The encryption can be a disruptive activity. For instance, in some conventional implementations, the encryption is performed by the guest operating system (guest OS), which can impede the performance of the VM. Other implementations encrypt the VM files when the VM is powered off, which can introduce unacceptable system down time. Such offline encryption can require additional disk space, which can be costly in terms of storage requirements when encrypting an entire virtual disk.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
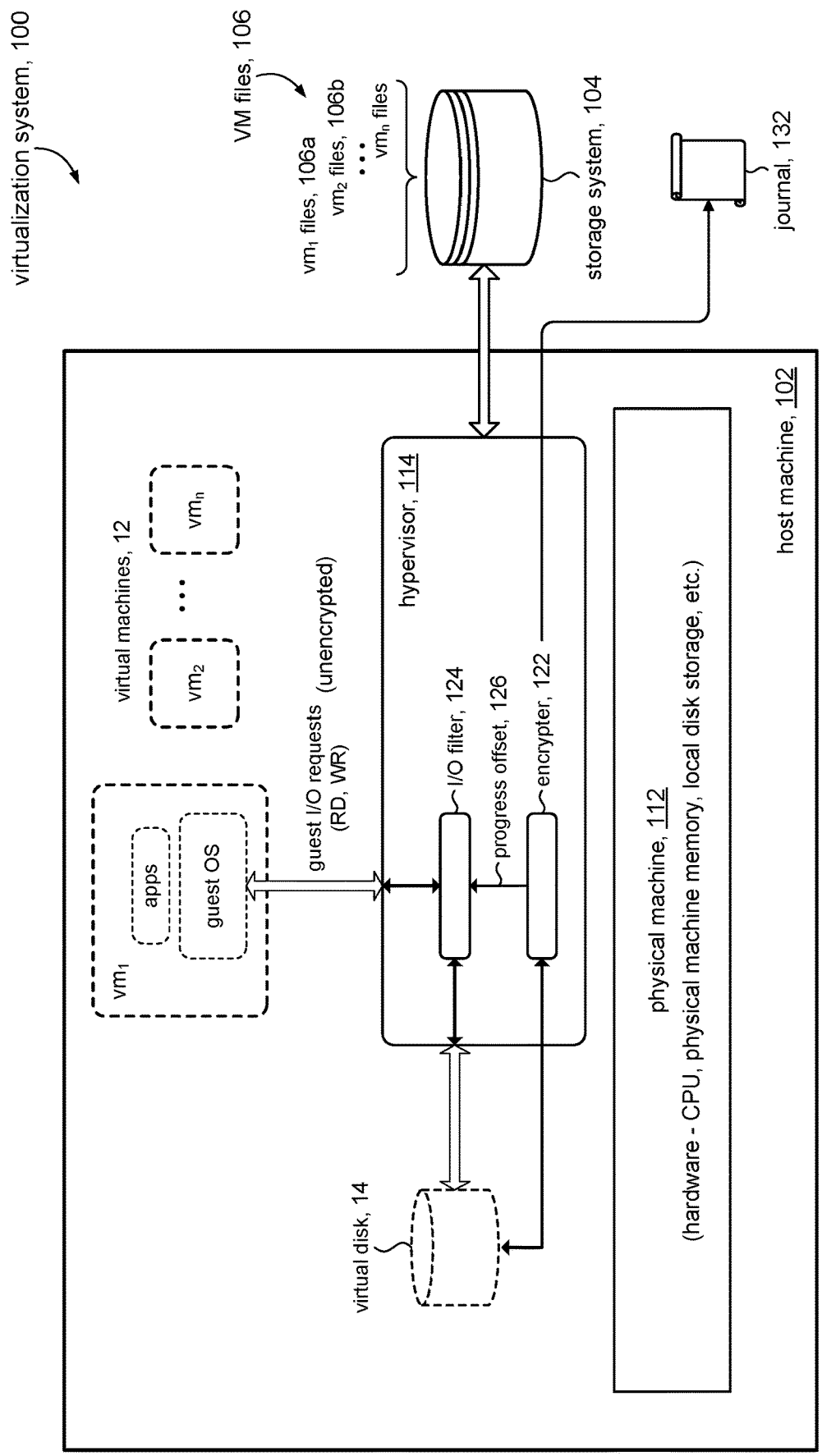
FIG. 1 represents an illustrative example of a virtualization system in accordance with some embodiments of the present invention.

FIG. 1 shows a virtualization system 100 in accordance with the present disclosure. In some embodiments, for example, the virtualization system 100 can include a host machine 102 and a storage system 104 for data storage to support the execution of virtual machines (VMs) 12 (e.g., $vm_1$, $vm_2$).

The host machine 102 includes a physical machine component 112 comprising hardware such as a central processing unit (CPU), physical machine memory, etc. The host machine 102 further includes a hypervisor component 114 comprising software modules for virtualizing the underlying physical machine 112 to run multiple VMs 12. The hypervisor 114 shares the resources (e.g., CPU, memory, etc.) of physical machine 112 across multiple VMs 12, allowing the VMs to run independently and separately from each other, side-by-side on the same physical machine. The VMs 12 can run different operating systems (OSs) and multiple different applications.

Virtual machine can be defined by physical files, VM files 106, that the hypervisor 114 can use to instantiate the virtual machines. FIG. 1, for example, illustrates that virtual machine $vm_1$ can defined by a set of files 106*a*, $vm_2$ is defined by a set files 106*b*, and so on. Merely for illustration, a set of files (e.g., 106*a*) for a given VM can include a configuration file that specifies the configuration of the virtual machine (e.g., $vm_1$); for example, the amount of virtual 'physical' memory that $vm_1$ will have, the type of guest OS that is installed on $vm_1$ (e.g., a Linux® OS, Windows® OS, etc.), size of virtual disk, networking information, and the like. A virtual disk file represents the virtual hard drive 14 that $vm_1$ will use for data storage, a log file can be used to log events detected by the hypervisor 114, and so on. The VM files 106 can be stored on storage system 104 and read in by the hypervisor 114 to instantiate VMs 12.

The hypervisor 114 monitors and coordinates operations of the VMs 12, including processing guest input/output (I/O) requests from a guest OS. For example, when the guest OS on a VM (e.g., $vm_1$) issues guest I/O requests to its virtual disk 14 (e.g., in response to I/O operations from applications running on $vm_1$), the hypervisor 114 detects the I/O requests and translates the I/O requests into file access operations that are performed on an actual file (e.g., the virtual disk file) that corresponds to virtual disk 14.

In accordance with the present disclosure, the hypervisor 114 can include a corresponding encrypter 122 for each VM 12 to encrypt the contents of the virtual disk 14 that is configured with the VM. FIG. 1 shows details for encrypter 122 corresponding to $vm_1$. In some embodiments, the encrypter 122 can encrypt the contents of virtual disk 14 in sequential order starting from data block 0 on the virtual disk. The encrypter 122 can execute as a background process or thread separately from other processes in the hypervisor 114. For example, the encrypter 122 can execute independently of $vm_1$ and any applications executing on $vm_1$. There is no coordination between operations of encrypter 122 and when the guest OS executing on $vm_1$ issues its I/O requests. Accordingly, the encrypter 122 can perform operations to encrypt the contents of virtual disk 14 concurrently with and independently of receiving and processing I/O requests issued by the guest OS running on $vm_1$.

In some embodiments, the encrypter 122 can use a journal file 132 to save certain information during the encryption process. The journal file 132 can keep track of changes to the virtual disk 14 not yet committed to the virtual disk. The journal file 132 can therefore provide crash-consistency in the event of an unexpected shutdown of $vm_1$, such as when the user powers-off $vm_1$ during an ongoing encryption operation by encrypter 122.

In accordance with the present disclosure, the hypervisor 114 can include a corresponding I/O filter 124 for each VM 12 to process guest I/O requests from the VM. FIG. 1 shows details for I/O filter 124 corresponding to $vm_1$. In some embodiments, the I/O filter 124 can collect statistics on the I/O operations of $vm_1$ such as number of read and write I/O's, the amount of data transferred with each I/O, history of files accessed, and so on. In accordance with the present disclosure, the I/O filter 124 can decrypt and encrypt blocks of data when transferring data between $vm_1$ and its virtual disk 14. As explained further below, data can be transferred between $vm_1$ and I/O filter 124 in unencrypted (cleartext) form. As between I/O filter 124 and virtual disk 14, however, data can be transferred in encrypted or in unencrypted form.

The encryption of virtual disk 14 by encrypter 122 can take considerable time; e.g., a virtual disk can be configured for many terabytes of storage. Since the encrypter 122 operates independently of other processes in the hypervisor 114, the encrypter 122 can use a disk progress offset 126 to indicate the progress of the encryption for the benefit of other processes in the hypervisor. In some embodiments, for example, the disk progress offset 126 can represent the block address of the most recently encrypted data block on virtual disk 14. In other embodiments, the disk progress offset 126 can be the block address on the virtual disk 14 of the next data block to be encrypted. The I/O filter 124 can use the disk progress offset 126 to decide whether to decrypt or encrypt data blocks when processing a guest I/O request. These aspects of the present disclosure are discussed in further detail below.

Figure 2:
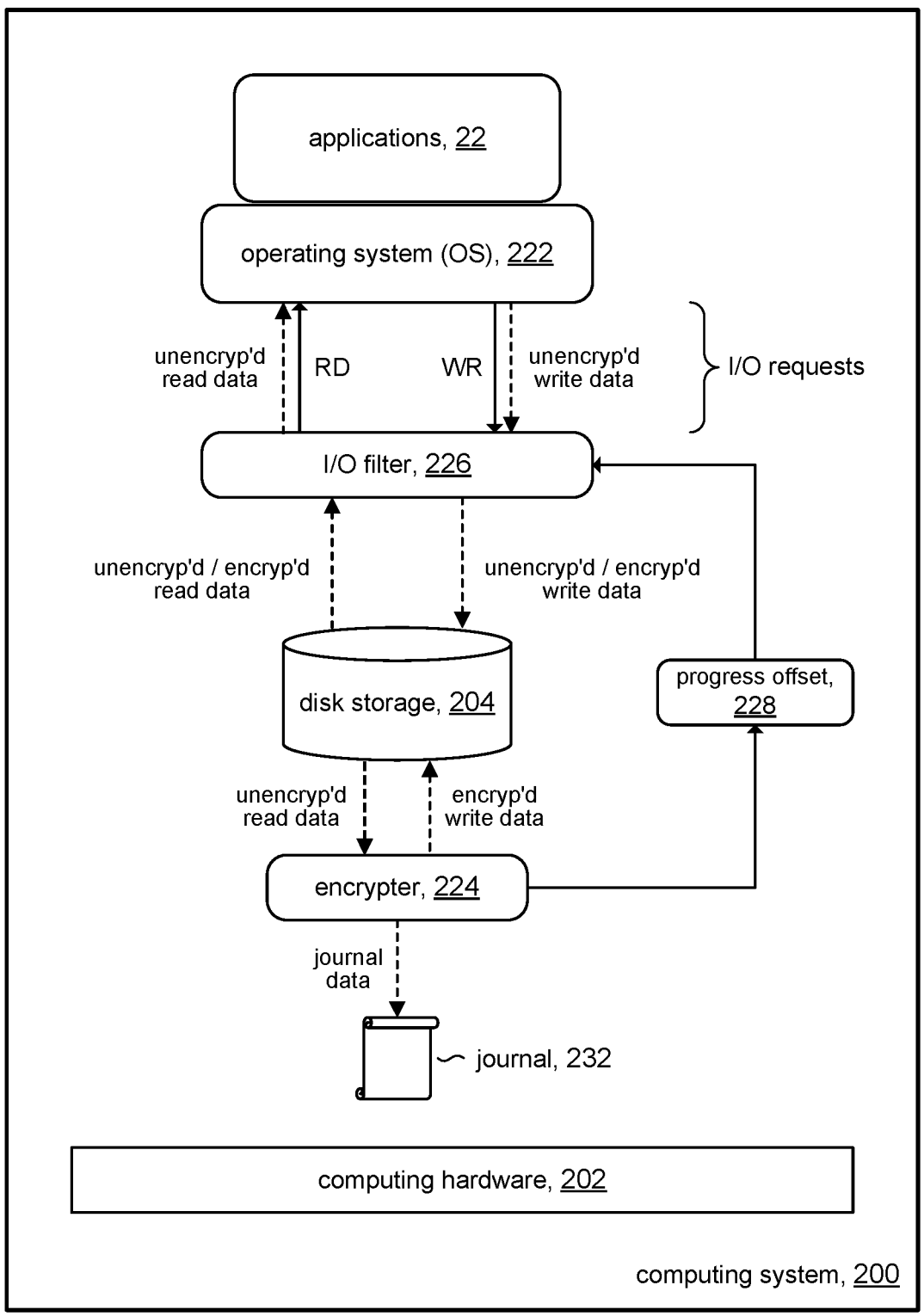
FIG. 2 represents an illustrative example of a computing system in accordance with some embodiments of the present invention.

FIG. 2 shows a computing system 200 adapted for operation in accordance with some embodiments of the present disclosure. The computing system 200 can include computing hardware 202 such as a central processing unit (CPU), main memory, and the like. The computing system 200 can include a disk storage device 204.

In accordance with the present disclosure, an operating system (OS) 222 executing on the computing system 200 can include an encrypter 224 and an I/O filter 226. The encrypter 224 can execute as a separate process in OS 222 to perform background encryption of data stored on the disk storage device 204. In some embodiments, for example, the encrypter 224 can encrypt the contents of disk storage device 204 in sequential order starting from data block 0 on the disk storage device. The encrypter 224 can execute independently of applications 22 executing on OS 222. There is no coordination between operations of encrypter 224 and when OS 222 issues I/O requests. Accordingly, the encrypter 224 can perform operations to encrypt the contents of disk storage device 204 concurrently with and independently of receiving and processing I/O requests issued by OS 222.

In some embodiments, the encrypter 224 can use a journal file 232 to save certain information during the encryption process. The journal file 232 can keep track of changes to the disk storage device 204 not yet committed to the disk storage device. In this way, the journal file 232 can provide crash-consistency in the event of an unexpected crash in the OS 222 or an improper shutdown of computing system 200.

In accordance with the present disclosure, the I/O filter 226 can process I/O requests from OS 222. In some embodiments, the I/O filter 226 can collect statistics on I/O request such as number of read and write I/O's, the amount of data transferred with each I/O, history of files accessed, and so on. In accordance with the present disclosure, the I/O filter 226 can decrypt and encrypt blocks of data when transferring data between OS 222 and disk storage device 204 while processing I/O requests. As explained further below, data transferred between OS 222 and I/O filter 226 can always be in unencrypted (cleartext) form. As between I/O filter 226 and disk storage device 204, however, data can be transferred in encrypted or in unencrypted form.

The encryption of disk storage device 204 by encrypter 224 can take considerable time; e.g., disk storage device 204 can have many terabytes of storage. Since the encrypter 224 operates independently of other processing in OS 222, the encrypter 224 can use a disk progress offset 228 to indicate the progress of the encryption. For example, the I/O filter 226 can use the disk progress offset 228 to decide whether to decrypt or encrypt data blocks when processing an I/O request. These aspects of the present disclosure are discussed in further detail below.

The discussion will turn to additional details of encrypter 122 and I/O filter 124 shown in FIG. 1. It will be understood that the description is generally applicable to encrypter 224 and I/O filter 226 shown in FIG. 2.

Figure 3:
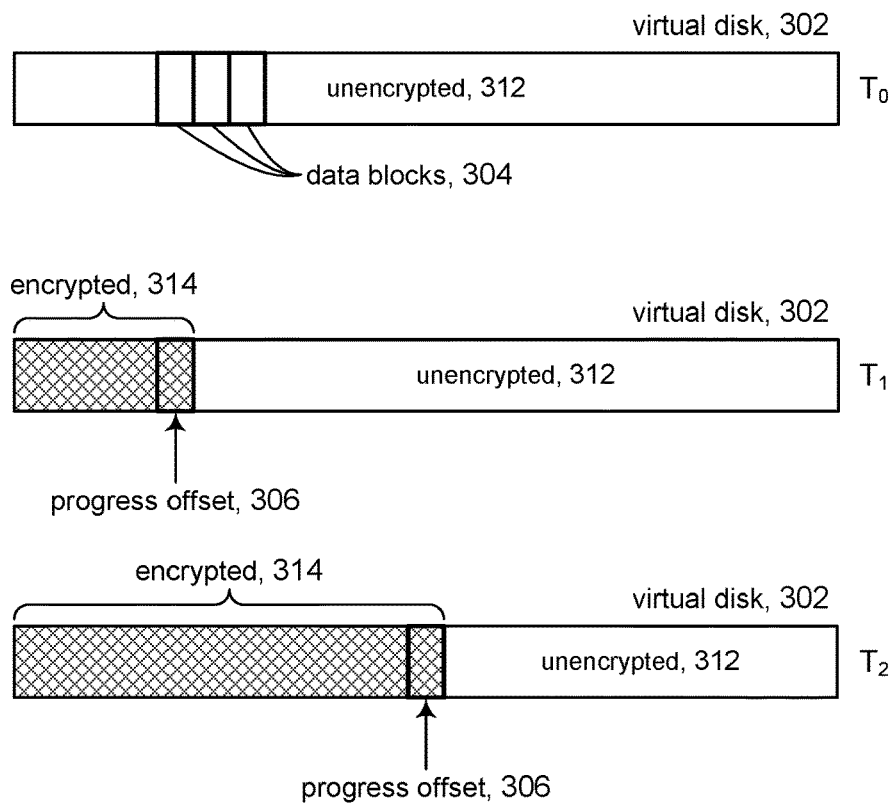
FIG. 3 represents encrypting a disk in accordance with some embodiments of the present invention.

FIG. 3 illustrates a progression of the encryption process by encrypter 122 in a virtual disk 302 in accordance with present disclosure. Data can be stored on the virtual disk 302 in units called data blocks. A data block 304 can be any suitable size; e.g., 512 bytes, 1 Kbytes, 4 Kbytes, etc. Data blocks 304 can be sequentially addressed by a block number (offset) starting with block #0 (where offset 0 is relative to the beginning of the virtual disk 302) and proceeding to block #(n−1), where 'n' represents the number of data blocks on the virtual disk 302. Data on the virtual disk 302 can initially be in unencrypted form. FIG. 3, for example, illustrates this initial state at an initial time $T_0$ where data 312 on virtual disk 302 is in unencrypted form. For example, encryption processing by encrypter 224 can initially be disabled when the VM is powered on for the very first time. At some time after time $T_0$, encryption processing may be turned on (enabled), for example, by a user of the VM, a system administrator, or the like.

The encryption process can start from the beginning of the virtual disk 302 at data block 0. If disk progress offset 306 defined as pointing to the most recently encrypted data block, then the disk progress offset 306 can be initialized to −1 (or some other suitable value that does not refer to a valid data block on virtual disk 302) since initially there is no "most recently" encrypted data block. As the encryption process proceeds, blocks of data on virtual disk 302 can be encrypted in sequence and the disk progress offset 306 can advance accordingly. For example, FIG. 3 shows that at time $T_1$, the virtual disk 302 includes a portion of encrypted data 314 and a portion of unencrypted data 312. The disk progress offset 306 points to the most recently encrypted data block and serves to demarcate the virtual disk 302 into an encrypted portion comprising encrypted data 314 and an unencrypted portion comprising unencrypted data 312. The encryption process continues, as shown in FIG. 3 at time $T_2$, where the disk progress offset 306 continues toward the end of the virtual disk 302.

Figure 4A:
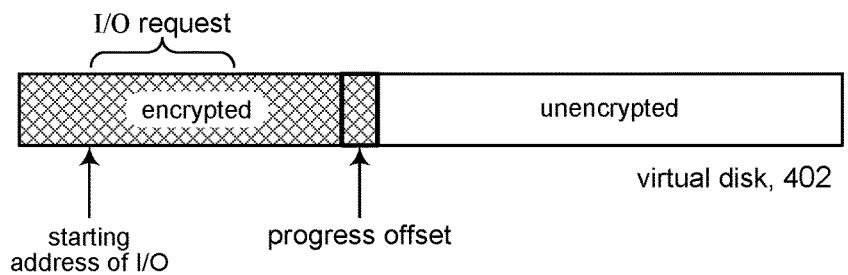
FIGS. 4A, 4B, 4C, represent I/O request scenarios during encrypting a disk in accordance with some embodiments of the present invention.
Figure 4B:
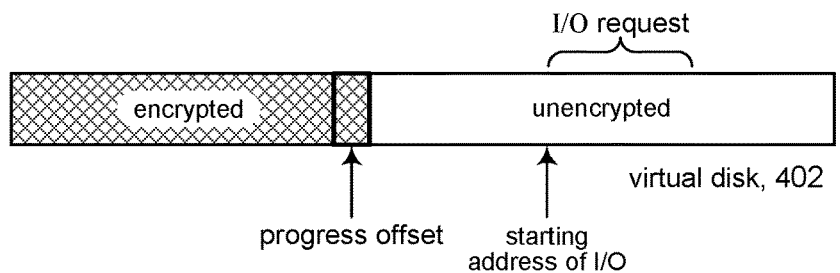
Figure 4C:
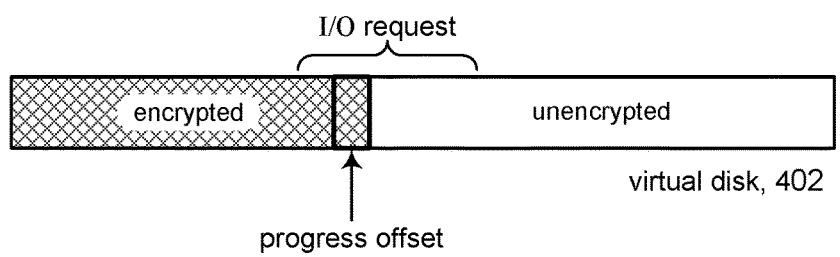

Referring to FIGS. 4A, 4B, 4C, an I/O request from the guest OS includes information that identifies the operation (RD, WR), information that represents a range of data blocks to be read (RD operation) or to be written (write operation), and other information. The range of data blocks for the I/O can be expressed as a starting block number (e.g., starting address—an offset of the data block relative to the beginning of the virtual disk 402) and the number of blocks involved in the I/O. Recall that the guest OS executing on $vm_1$ can issue I/O requests independently of encryption processing by encrypter 122. Accordingly, the range of data blocks specified in an I/O request can fall anywhere on the virtual disk 402. FIGS. 4A, 4B, and 4C illustrate three I/O scenarios that can occur during encryption processing by the encrypter 122. FIG. 4A shows that the range data blocks for an I/O request can fall entirely within the portion of the virtual disk 402 that comprises encrypted data. FIG. 4B shows that the range data blocks for an I/O request can be entirely within the portion of the virtual disk 402 that comprises unencrypted data. FIG. 4C shows that the data blocks for an I/O request can straddle both portions of the virtual disk 402. These scenarios can be taken into consideration when processing an I/O request in accordance with the present disclosure.

Figure 5:
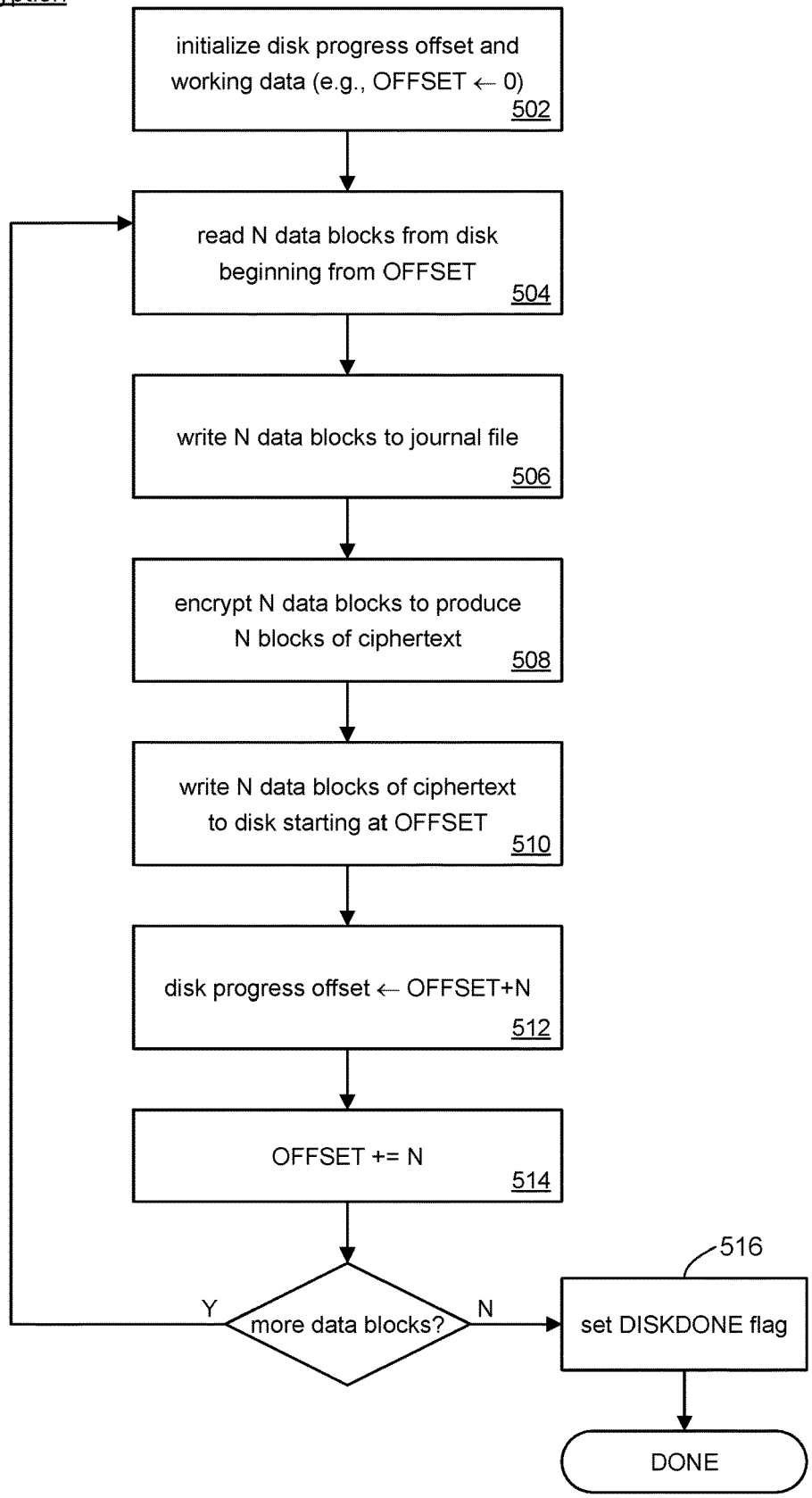
FIG. 5 shows operations for encrypting a disk in accordance with some embodiments of the present invention.

Referring to FIG. 5, the discussion will now turn to a high level description of processing in an encrypter (e.g., 122) for encrypting a virtual disk (e.g., 14) in accordance with the present disclosure. In some embodiments, for example, encrypter 122 can comprise computer executable program code, which when executed by a processor (e.g., 1302, FIG. 13) in a computer system (e.g., host machine 102), can cause the computer system to perform the processing in accordance with FIG. 5. The flow of operations performed by the computer system is not necessarily limited to the order of operations shown.

At operation 502, encrypter 122 can initialize various working data. For example, an OFFSET can be used to point to the data block on virtual disk 14 to be processed for encryption. Initially, OFFSET can point to data block 0 (e.g., OFFSET F←0). As for the disk progress offset (e.g., 126), if it is defined as pointing to the most recently encrypted data block on virtual disk 14, then encrypter 122 can initialize disk progress offset 126 to a value of −1 (or some other suitable value that does not refer to a valid data block). If disk progress offset 126 is defined as pointing to the next data block to be encrypted, then encrypter 122 can initialize disk progress offset 126 to point to data block 0 on virtual disk 14.

At operation 504, encrypter 122 can read out one or more data blocks from virtual disk 14 starting at the data block pointed at by OFFSET. The number N of data blocks to read out can be any suitable value; for example N=128, N=256, N=512, etc.

At operation 506, encrypter 122 can perform journaling for crash recovery purposes. In some embodiments, for the example, encrypter 122 can copy the data contained in the N data blocks that were read in at operation 504 to a journal file (e.g., 132) along with the values for OFFSET and disk progress offset 126. Since journal file 132 is used for crash recovery, the copy operation is an atomic operation. In other words, the copy operation is deemed to have been completed if and only if all the data read in from the N data blocks on virtual disk 14 have been copied to journal file 132 along with the values for OFFSET and disk progress offset 126; otherwise, the copy operation is deemed not to have been performed. In this way, the journal file 132 is guaranteed to have correct data so that if the VM (e.g., $vm_1$) is powered-off or crashes in the middle of encryption, the journal file 132 can be used to recover the virtual disk 14 when $vm_1$ is subsequently powered back on. For example, the journal file 132 can identify the data blocks in virtual disk 14 that were being processed (via OFFSET and N) at the time of the power-off or crash event. The journal file 132 contains the disk data of those data blocks that were read in at operation 504 prior to the crash, and can be copied back to the virtual disk 14, thus restoring those data blocks to the point prior to the power-off or crash event.

At operation 508, encrypter 122 can encrypt the data contained in the N data blocks. For example, in some implementations, AEX-XTS-256 disk encryption can be used. It will be appreciated, however, that any suitable symmetric encryption algorithm can be used, where the data contained in the N data blocks is the plaintext input to the encryption algorithm and the output of the encryption is ciphertext (encrypted data blocks).

At operation 510, encrypter 122 can write the N blocks of encrypted data (ciphertext) to the N data blocks on virtual disk 14 starting the data block pointed to by OFFSET, thus overwriting the unencrypted data that was originally stored in those N data blocks. Suppose the VM is powered-off or otherwise crashes during this operation. The N data blocks on virtual disk 14 can wind up in an indeterminate data state; some of the N data blocks may be encrypted and the others unencrypted, perhaps one data block will contain both encrypted and unencrypted data. However, the original data for the N data blocks is stored in journal file 132 (per atomic operation 506), and so the N data blocks on virtual disk 14 can be restored to their original data state when the VM is subsequently powered back on. Encryption processing can resume from the recovery point.

At operation 512, encrypter 122 can update disk progress offset 126. The update operation shown in FIG. 5 can be used when disk progress offset 126 is defined as pointing to the most recent encrypted data block. On the other hand, the following operation:

$$\text{disk progress offset} \leftarrow \text{OFFSET} + N$$

can be used if disk progress offset 126 is defined as pointing to the next data block to be encrypted.

At operation 514, encrypter 122 can increment OFFSET to point to the next N data blocks to be encrypted.

When the end of the virtual disk 14 has been reached, processing in encrypter 122 can terminate at operation 516 (e.g., encrypter 122 can set a DISKDONE flag); otherwise processing can return to operation 504 to process the next set of N data blocks.

In some embodiments, as described in operation 506, the unencrypted data that is read in from virtual disk 14 can be journaled in journal file 132. In other words, the journaling can be done on unencrypted data. It will be appreciated, that in other embodiments, the journaling can be performed on the data blocks are encrypted (operation 508) before the encrypted data blocks are written to virtual disk 14.

Figure 6:
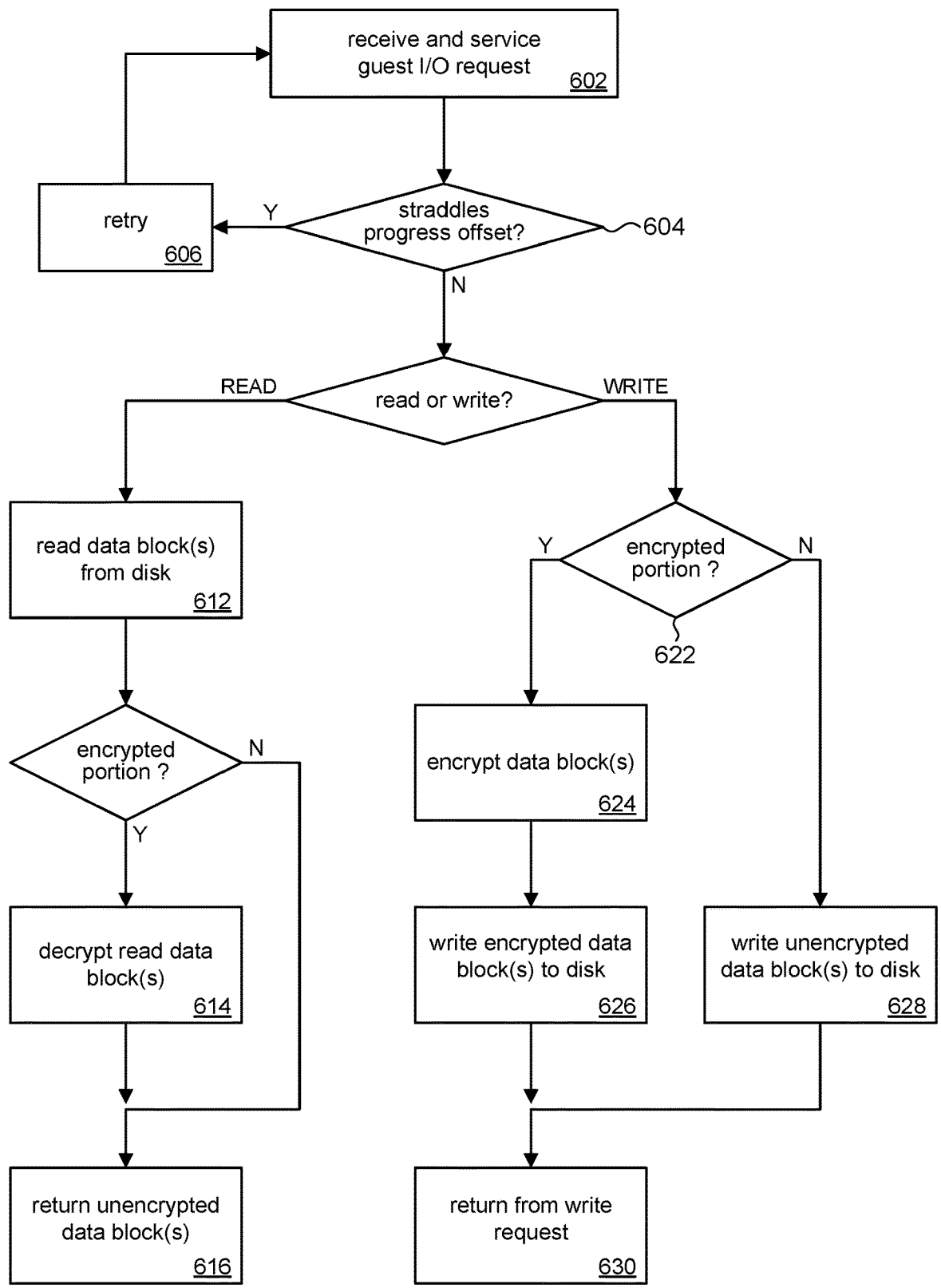
FIG. 6 shows operations for servicing I/O requests on a disk in accordance with some embodiments of the present invention.

Referring to FIG. 6, the discussion will now turn to a high level description of processing in an I/O filter (e.g., 124) for servicing guest I/O requests in accordance with the present disclosure. In some embodiments, for example, I/O filter 124 can comprise computer executable program code, which when executed by a processor (e.g., 1302, FIG. 13) in a computer system (e.g., host machine 102), can cause the computer system to perform the processing in accordance with FIG. 6. The flow of operations performed by the computer system is not necessarily limited to the order of operations shown.

At operation 602, I/O filter 124 can receive guest I/O requests issued from a guest OS executing on a VM (e.g., vm$_1$) to be serviced. The guest OS can issue I/O requests in response to applications executing on vm$_1$, for example. Recalling that encrypter 122 acts independently of software (guest OS, apps) executing on vm$_1$, the I/O filter 124 can receive and service I/O requests from the guest OS concurrently with and independently of the encrypter 122.

At operation 604, I/O filter 124 can determine whether the received I/O request straddles the disk progress offset 126. In some embodiments, for example, the received I/O request can include information that identifies the range of data blocks (e.g., target offsets) on virtual disk 14 that is the target of the I/O request; e.g., a read operation can specify the range of data blocks on virtual disk 14 to read from, while a write operation can specify a range of data blocks on virtual disk 14 to write to. If the range of data blocks straddles the disk progress offset 126 (as explained in FIG. 4C), then processing can continue to operation 606. Otherwise, processing can proceed down the READ branch or the WRITE branch, depending on the operation in the I/O request.

At operation 606, I/O filter 124 can retry the I/O request at a later time in response to determining that the range of data blocks specified in the I/O request straddles the disk progress offset 126. Since encrypter 122 operates independently of when an I/O request is received and when it is processed, the data state of a range of data blocks that straddles the disk progress offset can be unpredictable because the disk progress offset 126 can advance independently of processing of the received I/O request. Accordingly, in some embodiments, an I/O request that straddles the disk progress offset 126 can be retried. In some embodiments, for example, the I/O filter 124 may have a corresponding I/O queue for queuing up I/O requests from the guest OS. The I/O request can be re-queued on the I/O queue to be picked up at a later time and retried. The discussion will now turn to processing read and write operations for I/O's that do not straddle the disk progress offset 126.

Read Branch—Processing to Process a Read Operation

At operation 612, I/O filter 124 can process a read operation by reading the range of data blocks on virtual disk 14 specified in the I/O request. For example, the read I/O request can specify a range of offset addresses of the data blocks. If the range of data blocks falls within the portion of the virtual disk 14 that has been encrypted by encrypter 122 (e.g., FIG. 4A—the data blocks are at offsets less than the disk progress offset 126), then processing can proceed to operation 614. Otherwise, if the range of data blocks falls within the portion of the virtual disk 14 that has not yet been processed by encrypter 122 (unencrypted, e.g., FIG. 4B—the data blocks are at offsets greater than the disk progress offset 126), then processing can proceed to operation 616.

At operation 614, I/O filter 124 can decrypt the encrypted data blocks that were read in at operation 612 to produce unencrypted data blocks.

At operation 616, I/O filter 124 can return unencrypted data blocks to the guest OS in response to the I/O request to read from the virtual disk 14. The data blocks are unencrypted either because they were read out from the unencrypted portion of virtual disk 14 to begin with, or they were read out from the encrypted portion of virtual disk 14 in encrypted form and decrypted at operation 614. Although the actual encrypted/decrypted data state of virtual disk 14 is in flux due to the independent background processing of encrypter 122, I/O filter 124 ensures that a read I/O request issued from the guest OS returns to the guest OS with plaintext data. The actual encrypted/decrypted data state of virtual disk 14 is therefore transparent to the guest OS from the point of view of read operations.

Write Branch—Processing to Process a Write Operation

At operation 622, I/O filter 124 can determine the range of data blocks on virtual disk 14 that is targeted by the write operation in the I/O request. For example, the write I/O request can specify a range of offset addresses of the data blocks. If the target range falls within the portion of virtual disk 14 that has been encrypted by encrypter 122 (e.g., FIG. 4A—the data blocks offset are less than the disk progress offset 126), then processing can proceed to operation 624. Otherwise, if the target range falls within the portion of virtual disk 14 that has not yet been processed by encrypter 122 (unencrypted, e.g., FIG. 4B—the data blocks offset are greater than the disk progress offset 126), then processing can proceed to operation 628.

At operation 624, I/O filter 124 can encrypt the unencrypted data blocks specified in the I/O request, since the data blocks specified in the I/O request are to be written in the encrypted portion of virtual disk 14.

At operation 626, I/O filter 124 can write the encrypted data blocks to the virtual disk 14. The I/O request can be deemed complete and processing con proceed to operation 630.

At operation 628, I/O filter 124 can write the data specified in the I/O request, which is unencrypted, directly to virtual disk 14 as plaintext without having to perform an encryption of the data, since the data blocks specified in the I/O request are to be written in the unencrypted portion of the virtual disk. The I/O request can be deemed complete and processing con proceed to operation 630.

At operation 630, I/O filter 124 can return a suitable return value to the guest OS in response to the I/O request to write to the virtual disk 14. Although the actual encrypted/decrypted data state of virtual disk 14 is in flux due to the independent background processing of encrypter 122, I/O filter 124 ensures that a write I/O request issued from the guest OS correctly writes data to the virtual disk 14 in encrypted or unencrypted form and thus avoids corrupting the data state of the virtual disk. The actual encrypted/decrypted data state of virtual disk 14 is therefore transparent to the guest OS from the point of view of write operations.

Figure 7:
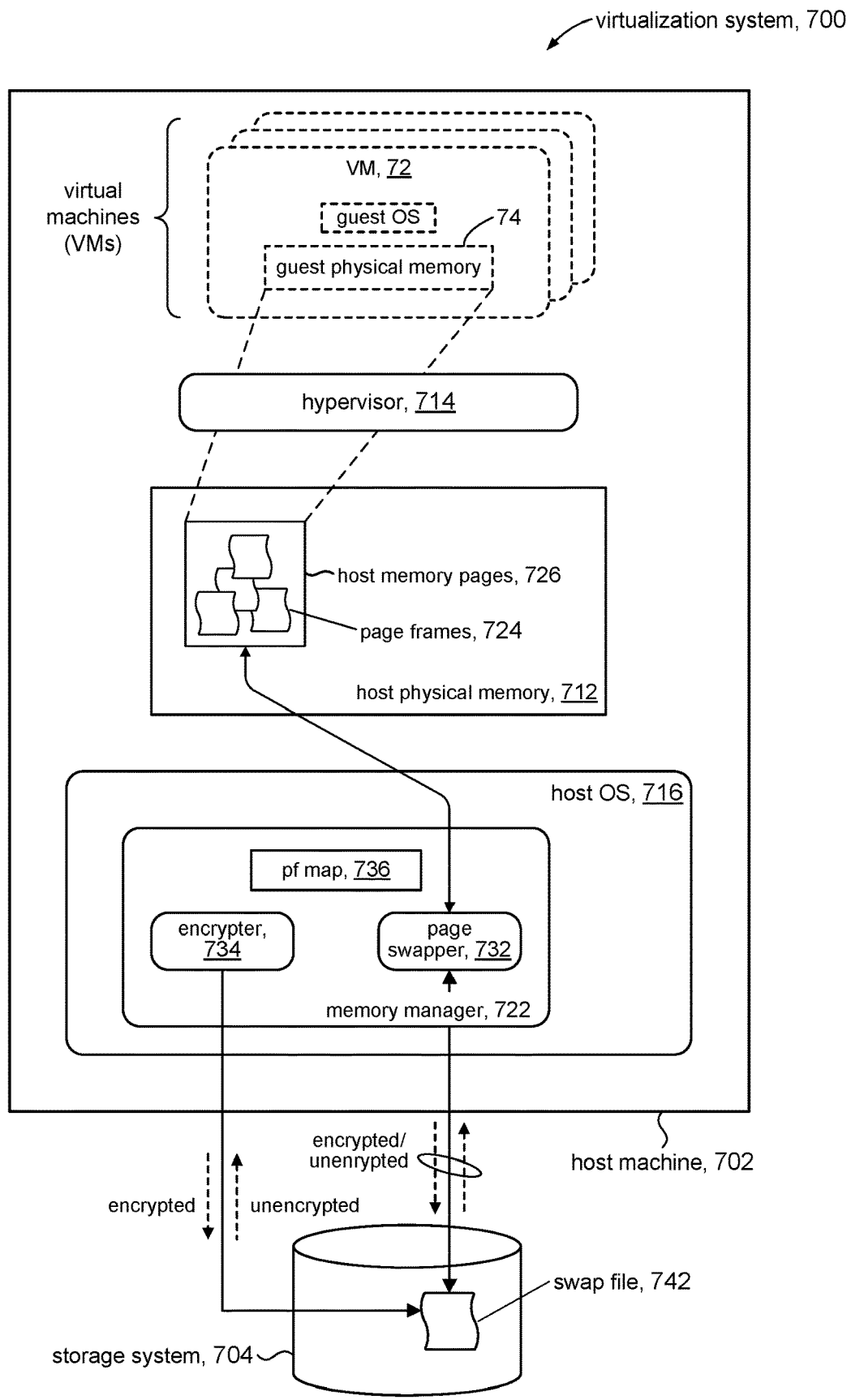
FIG. 7 represents an illustrative example of a virtualization system in accordance with some embodiments of the present invention.

Referring to FIG. 7, the discussion will now turn to a description of a virtualization system 700 in accordance with the present disclosure comprising a host machine 702 and a storage system 704 for data storage to support the execution of one or more virtual machines (VMs).

The host machine 702 can be a physical machine comprising hardware including a host physical memory 712. The host machine 702 can further include a hypervisor component 714 comprising software modules for virtualizing the underlying hardware comprising host machine 702 to run one or more VMs. The hypervisor 714 shares the resources (e.g., CPU, memory, etc.) of host machine 702 across the multiple VMs, allowing the VMs to run independently and separately from each other.

The host machine 702 can further include a host operating system (OS) 716 to manage the physical resources of the host machine 702 including the host physical memory 712. Host OS 716, for example, can include a memory manager 722 to manage host physical memory 712.

With respect to virtualization, host physical memory 712 backs the "physical" memory configured for each of the VMs, referred to as guest physical memory. Guest physical memory represents the virtual RAM that a VM is configured with. FIG. 7, for example, shows a VM 72 comprising guest physical memory 74. The guest physical memory 74 is backed by host memory pages 726 allocated from host physical memory 712. In some instances, the host memory pages 726 can provide memory equal in size to the amount of guest physical memory 74 configured for VM 72. For example, if VM 72 is configured with 16 GB of guest physical memory 74, then 16 GB of host memory pages 726 can be allocated from host memory 712 to back the guest physical memory 74; each location in (virtual) guest physical memory is backed by or maps to a (real) physical location memory in host physical memory 712. In some instances, the size of a memory page (page frame) in guest physical memory 74 is the same as a page of host physical memory 712 and in other instances the page sizes are not 1 to 1.

In practice, host physical memory 712 is limited and host machine 702 may not be able to provide 100% backing of the guest physical memory of every VM. The host memory pages 726 that back the guest physical memory of a VM (e.g., 72) may be less than the configured size of the guest physical memory. For example, VM 72 may be configured to have 512 GB of guest physical memory 74, but may only be backed by 2 GB of host memory pages 726. Thus, only 2 GB of the total 512 GB address space of VM 72 is backed by the host physical memory 712 at any one time.

A swap file can be used to represent the full address space of a VM when guest physical memory in a VM is not 100% backed. Each VM can be associated with a corresponding swap file. VM 74, for example, can be associated with swap file 742, which can be stored on storage system 704. The swap file 742 can logically represent the full 512 GB address space of the guest physical memory 74 of VM 72.

When VM 72 accesses a memory location(s) in guest physical memory 74 that is not backed by host memory pages 726, this can result in a page fault event in the memory manager 722. The page fault event can trigger the memory manager 722 to free up space in the host 702 by swapping out (page out) one or more page frames 724 of guest physical memory 74 that are currently backed by host physical memory 712 to the swap file 742 and then to swap in (page in) one or more page frames 724 stored in the swap file 742 that correspond to the accessed memory location(s) in guest physical memory 74. The memory manager 722 can include a page frame map 736 to track where page frames 724 of guest physical memory 74 are stored in the swap file 742.

In accordance with the present disclosure, the memory manager 722 can include a page swapper 732 and a swap file encrypter 734. The page swapper 732 can swap out and swap in page frames 724 between host physical memory 712 and swap file 742. In accordance with the present disclosure, the page swapper 732 can encrypt or decrypt the pages of memory 724 that are written into or read out of the swap file 742. This aspect of the present disclosure is discussed in more detail below.

In accordance with the present disclosure, the swap file encrypter 734 can encrypt the contents of swap file 742. In some embodiments, for example, the swap file encrypter 734 can encrypt the contents of swap file 742 in increasing sequential order starting from memory page 0 in the swap file. Operations performed by the swap file encrypter 734 can occur independently of operations performed by the page swapper 732. There is no coordination between encrypting operations of the swap file encrypter 734 and the page in and page out operations of the page swapper 732. The swap file encrypter 734 can perform its operations concurrently with and independently of the occurrence of page faults in the memory manager 722 and the consequent operations in the page swapper 732 triggered by those page faults. This aspect of the present disclosure is discussed in more detail below.

The swap file encrypter 734 can update the page frame map 736 to indicate which blocks in the swap file 742 are encrypted. In accordance with the present disclosure, the page swapper 732 can use the page frame map 736 to determine whether to encrypt, decrypt, or do nothing to memory pages being swapped into and out of swap file 742.

The size of page frames 724 in guest physical memory 74 and the size of swap file data blocks need not be the same. Generally, there is no restriction as to the relative sizes of guest page frames 724 and swap file data blocks. However, for the purposes of the remaining discussion, and without loss of generality, the convention will be that the page frame size and swap file data block size are the same. Thus for the remaining discussion, one page of guest physical memory 74 can be assumed to fit into one data block in the swap file 742.

Access to memory locations in guest physical memory 74 by the guest OS is largely non-deterministic. As such, the page frames 724 of guest physical memory 74 that are backed by host memory pages 726 and when those backed page frames 724 are swapped in and out with the swap file 742 are likewise going to be similarly non-deterministic. Accordingly, although swap file 742 represents the full address space of guest physical memory 74, the page frames 724 of guest physical memory 74 may not be stored in the swap file 742 in any particular order, and over time, page frames of guest physical memory 74 can appear to be randomly distributed throughout the swap file 742.

Figure 8:
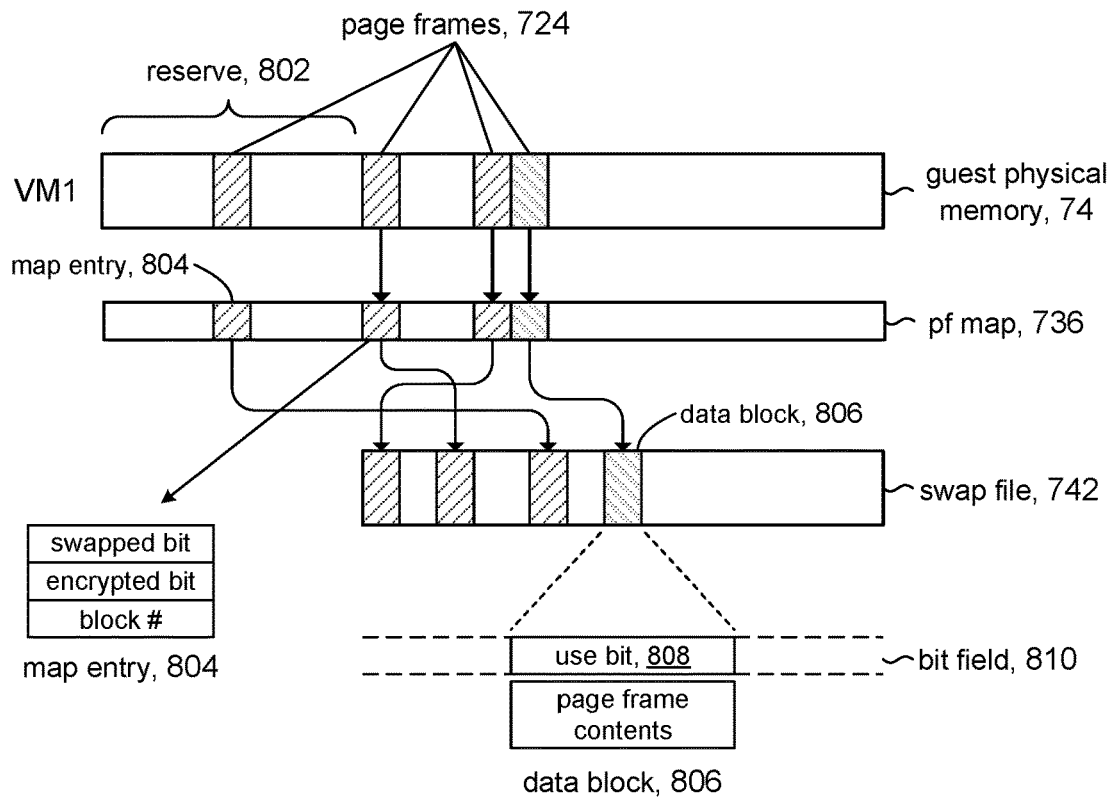
FIG. 8 depicts the use of mapping information in accordance with some embodiments of the present invention.

FIG. 8 illustrates the relationship between the page frame map 736, guest memory page frames 724, and data blocks in the swap file 742. In some embodiments, for example, the page frame map 736 comprises map entries 804 that correspond to respective page frames 724 in guest physical memory 74 of a VM (e.g., $VM_1$). In accordance with some embodiments, each map entry 804 can include a swapped bit that indicates if the corresponding page frame 724 is swapped out to the swap file 742 or not. For example, if the swapped bit is in one data state (e.g., logic 1), that can mean the page frame has been swapped out; and if the swapped bit is in another data state (e.g., logic 0), that can mean the page frame is backed by the host physical memory (e.g., 712, FIG. 7). Each map entry 804 can include an encrypted bit that indicates whether the corresponding page frame 724 is encrypted or not. The encrypted bit is relevant when the page frame has been swapped out an stored in the swap file 724. A block # data field in the map entry 804 identifies the location of the swap file data block 806 in the swap file 742 where the corresponding page frame 724 is stored (in the case where the page frame has been swapped out).

In accordance with some embodiments, each swap file data block 806 can be associated with a use bit 808 that indicates whether or not the data block stores a page frame 724. In some embodiments, for example, if the swap file comprise N data blocks, the use bit 808 can be one bit in a swap file bit field 810 having N use bits, where each use bit corresponds to a respective one of the N data blocks in the swap file. The swap file 742 can include as many data blocks 806 as needed to accommodate every page frame 724 of guest physical memory 74, less the reserve 802. The "reserve" refers to how much host physical memory is guaranteed to be allocated to back a powered-on virtual machine. For example, suppose a VM is configured for 4 GB of memory with a reserve of 1 GB. This means that 1 GB of host physical memory will be permanently guaranteed to the VM for the time that the VM is powered on. As such, the swap file 742 need only accommodate 3 GB of guest physical memory because at most only 3 GB of guest physical memory will be swapped out.

FIG. 8 shows an example where a data block 806 in the swap file 742 stores one page frame. This one-to-one relationship is not necessary. It will be appreciated that in some embodiments, for example, several page frames may be stored per swap file data block.

Figure 9:
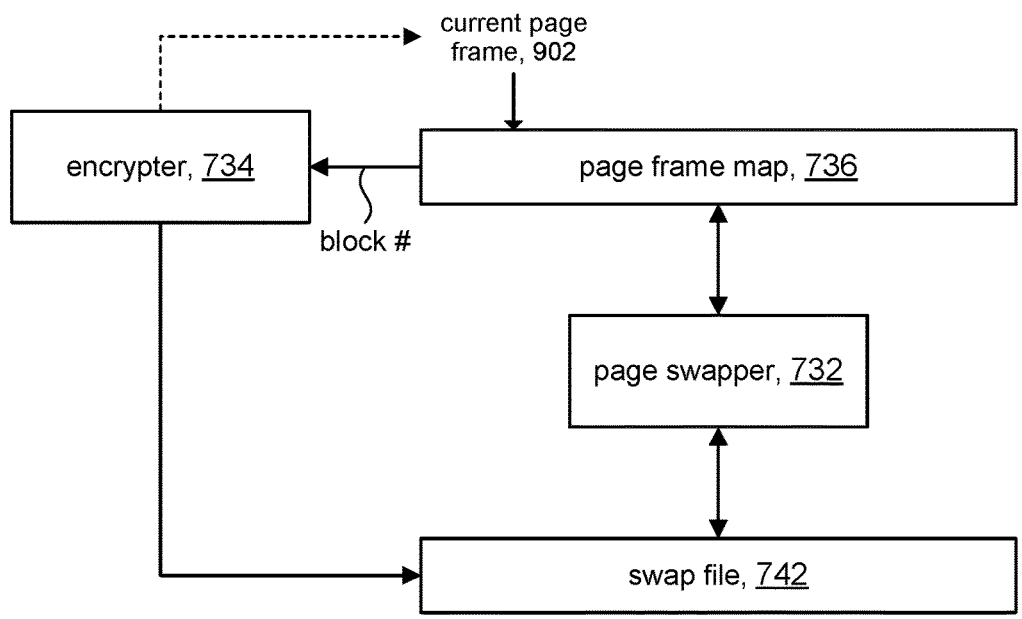
FIG. 9 represents encrypting a swap file in accordance with some embodiments of the present invention.

FIG. 9 illustrates how the encrypter 734 and the page swapper 732 can interact with the page frame map 736 in accordance with the present disclosure. In some embodiments, for example, the encrypter 734 can maintain a current page frame pointer 902 that starts from the beginning of the page frame map 736 and is incremented as page frames comprising guest physical memory 74 are encrypted in sequential order. The encrypter 734 can obtain the block # of corresponding to a page frame from the map 736 and use that block # to access and encrypt the page frame data from the swap file 742. This aspect of the present disclosure is discussed in the flow of operations below.

In some embodiments, the encrypter 734 can execute as a thread in the host machine 702 (FIG. 7). Likewise, the page swapper 732 can execute as another thread separately and independently of the encrypter 734 to process page faults. Operation of the page swapper 732 in accordance with the present disclosure is discussed below.

Figure 10:
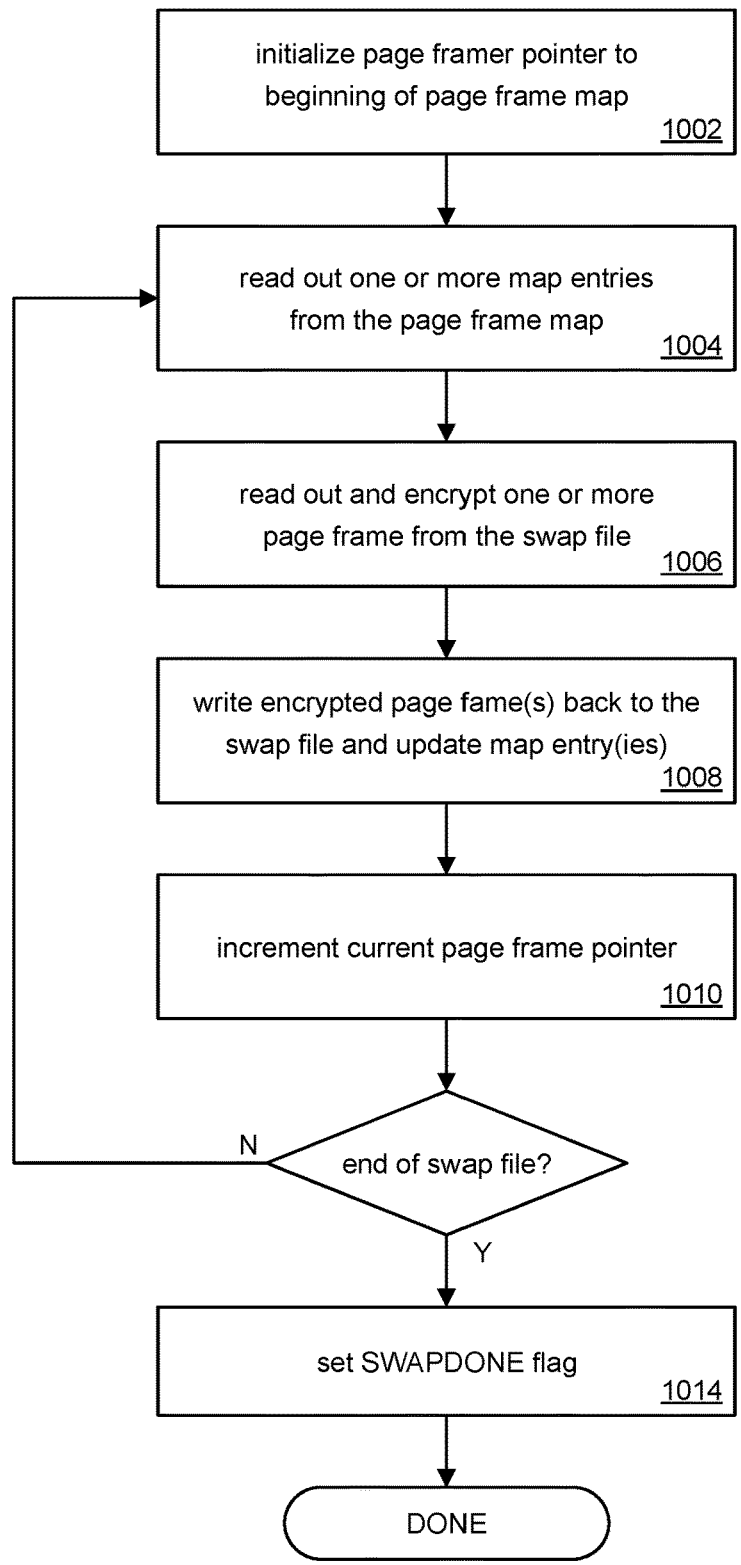
FIG. 10 shows operations for encrypting a swap file in accordance with some embodiments of the present invention.

Referring to FIG. 10, the discussion will now turn to a high level description of processing in a swap file encrypter (e.g., 734) for encrypting a swap file (e.g., 742) in accordance with the present disclosure. In some embodiments, for example, swap file encrypter 734 can comprise computer executable program code, which when executed by a processor (e.g., 1302, FIG. 13) in a computer system (e.g., host machine 102), can cause the computer system to perform the processing in accordance with FIG. 10. The flow of operations performed by the computer system is not necessarily limited to the order of operations shown.

At operation 1002, swap file encrypter 734 can initialize various working data when encryption is enabled. In some embodiments, for example, swap file encryption can be turned on or otherwise enabled some time after the VM is powered on; e.g., by a system administrator. When enabled, the swap file encrypter can initialize the current page frame pointer (e.g., 902) to point to the beginning (first map entry) in the page frame map 736.

At operation 1004, swap file encrypter 734 can read out one or more map entries (e.g., 804) from the page frame map starting at the entry pointed to by the current page frame pointer. The number N of map entries to read out (and hence page frames to be processed) can be any suitable number. For example, in a large swap file, it may be desirable to process more than one page frame at a time in order to improve I/O performance with the swap file 742.

At operation 1006, swap file encrypter 734 can read out one or more page frames from the swap file using the block # information contained in the map entries that were read out in operation 1004. The swap file encrypter can encrypt the data contained in the page frames that were read out.

At operation 1008, swap file encrypter 734 can write the encrypted page frames back to their block locations in the swap file 742, thus overwriting the original unencrypted memory page. The swap file encrypter can then set the encrypted bit in the map entry(ies) to indicate the page frames have been encrypted.

At operation 1010, swap file encrypter 734 can update current page frame pointer. When all the map entries in the page frame map have been processed, processing in swap file encrypter 734 can terminate at operation 1012 (e.g., swap file encrypter 734 can set a SWAPDONE flag); otherwise processing can repeat by returning to operation 1004.

Figure 11:
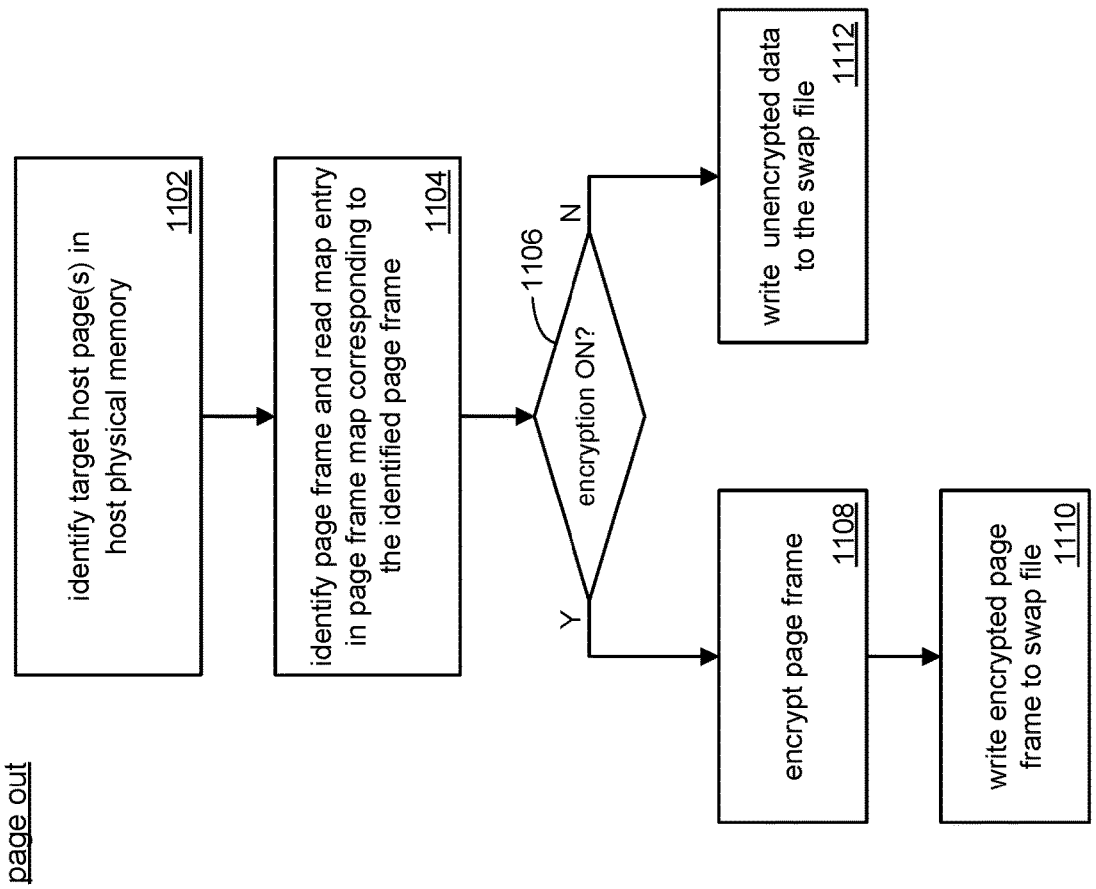
FIG. 11 shows operations for paging out memory to a swap file in accordance with some embodiments of the present invention.

Referring to FIG. 11, the discussion will now turn to a high level description of processing in a page swapper (e.g., 732) for servicing page out operations in response to page faults in accordance with the present disclosure. In some embodiments, for example, page swapper 732 can comprise computer executable program code, which when executed by a processor (e.g., 1302, FIG. 13) in a computer system (e.g., host machine 102), can cause the computer system to perform the processing in accordance with FIG. 11. The flow of operations performed by the computer system is not necessarily limited to the order of operations shown.

Operation of the page swapper 732 can be triggered by a page fault. For example, when the guest OS in a VM (e.g., 72) accesses memory locations in the guest physical memory 74 that is not currently backed by the host memory pages 726 allocated to VM 72, this can trigger a page fault. If the accessed memory locations map to one or more memory pages in the swap file 742, then those memory pages need to be swapped into the host memory pages 726. Before that can happen, one or more of the host memory pages 726 need to be swapped out. The process of swapping out host memory pages 726 in accordance with the present disclosure can begin with operation 1102. It should be appreciated, however, that a swap-in operation does not need to be preceded by a swap-out operation. In some embodiments, for instance, one or more swap-outs may be executed independently by the hypervisor component 114 (FIG. 1). For example, the hypervisor component 114 can ensure that enough swap-outs happen so that a swap-in can be effected without a preceding a swap-out operation to reduce delay.

At operation 1102, page swapper 732 can identify one or more of the host memory pages 726 to be swapped out, referred to herein as "target host pages." Page swapper 732 can use any suitable page replacement algorithm to identify the target host pages. In some embodiments, for example, page swapper 732 can use a least recently used (LRU) algorithm to identify the target host pages. Each identified target host page can be processed on at a time according to the remaining operations.

At operation 1104, page swapper 732 can identify the page frame of the guest memory that is stored in the identified target host memory page. The page swapper can read the map entry from the page frame map that corresponds to the identified page frame. If encryption is determined to be enabled at decision operation 1106, then processing can proceed to operation 1108, otherwise processing can proceed to operation 1112.

At operation 1108, page swapper 732 can encrypt the page frame that is stored in the target host memory page, for example, using the encryption algorithm as in operation 1008 (FIG. 10). The page swapper can then set the encrypted bit in the map entry that was read in at operation 1104 to indicate the page frame is encrypted.

At operation 1110, page swapper 732 can write the encrypted page frame to the swap file. In some embodiments, for example, the page swapper can scan the swap file bit field (e.g., 810, FIG. 8) to identify an unused data block in the swap file 742. The encrypted page frame can be written to the data block, and the block # of the data block can be written to the block # data field in the map entry that was read in at operation 1104 to indicate the location of the encrypted page frame in the swap file. The page swapper can set the swapped bit in the map entry to indicate the page frame has been swapped out (reference operation 1210, FIG. 12).

Processing can return to operation 1104 to process the next target host page, if the current page fault involves swapping out multiple pages of host memory. Otherwise, processing of the current page fault by the page swapper 732 can be deemed complete.

At operation 1112, page swapper 732 can store the unencrypted page frame to the swap file, since encryption is disabled (N branch from decision operation 1106). As described in operation 1110, the page swapper can scan the swap file bit field to identify an unused data block in the swap file 742 (reference operation 1204, FIG. 12). The page frame can be written to the data block in unencrypted form, and the block # of the data block can be written to the block # data field in the map entry that was read in at operation 1104 to indicate the location of the encrypted page frame in the swap file. The swapped bit in the map entry can be set to indicate the page frame has been swapped out (reference operation 1210, FIG. 12). Processing can return to operation 1104 to process the next target host page, if the current page fault involves swapping out multiple pages of host memory. Otherwise, processing of the current page fault by the page swapper 732 can be deemed complete.

Figure 12:
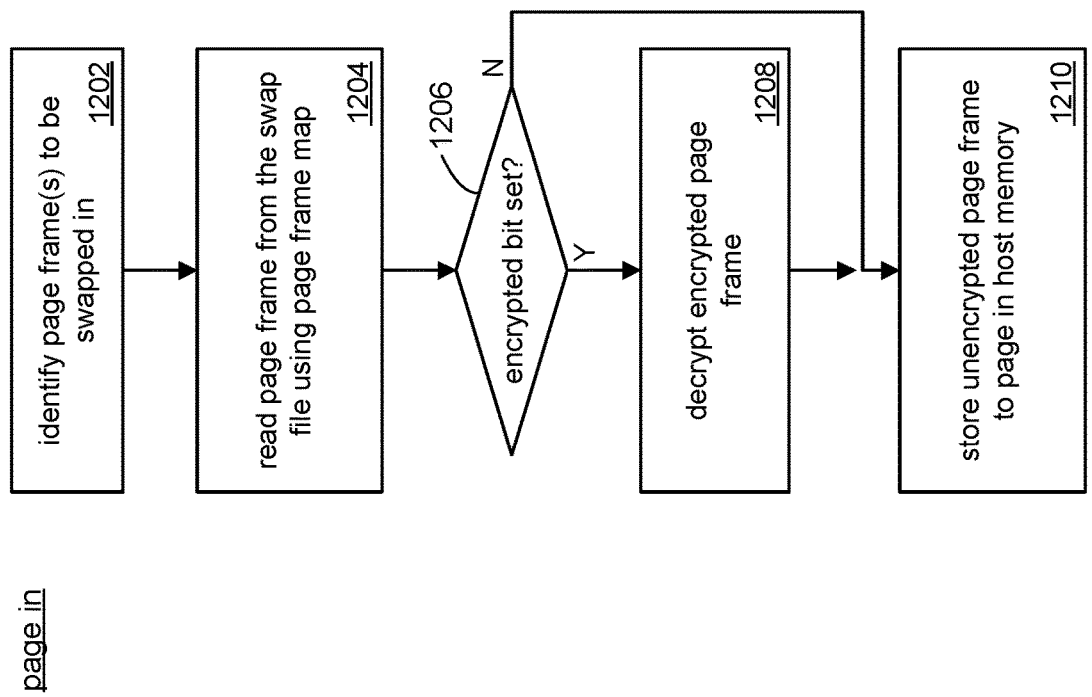
FIG. 12 shows operations for paging in memory from a swap file in accordance with some embodiments of the present invention.

Referring to FIG. 12, the discussion will now turn to a high level description of processing in a page swapper (e.g., 732) for servicing page in operations in response to page faults in accordance with the present disclosure. In some embodiments, for example, page swapper 732 can comprise computer executable program code, which when executed by a processor (e.g., 1302, FIG. 13) in a computer system (e.g., host machine 102), can cause the computer system to perform the processing in accordance with FIG. 12. The flow of operations performed by the computer system is not necessarily limited to the order of operations shown.

As discussed above, operation of the page swapper 732 can be triggered by a page fault. For example, when the guest OS in a VM (e.g., 72) accesses memory locations in the guest physical memory 74 that is not currently backed by the host memory pages 726 allocated to VM 72, this can trigger a page fault. FIG. 11 discloses operations in accordance with the present disclosure for swapping out one of more host memory pages 726. The process of swapping in memory pages from the swap file 742 in accordance with the present disclosure can begin with operation 1202.

At operation 1202, page swapper 732 can identify one or more page frames to be read in from the swap file 742. In some embodiments, for example, the one or more page frames of guest physical memory 74 can be identified from the address or address range of the memory being accessed by the guest OS. The identified page frames, which will be referred below to as "target page frames," can be processed one at a time. In accordance with some embodiments, swapping in a target page frame can proceed according to the remaining operations.

At operation 1204, page swapper 732 can read in the target page frame from the swap file 742. In some embodiments, for the example, the page swapper can access the map entry in the page frame map that corresponds to the target page frame. The block # data field in the accessed map entry provides the location of the data block in the swap file that contains the target page frame. The page swapper can update the swap file bit field (e.g., 810, FIG. 8) to set the use bit that corresponds to the data block in the swap file identified by block # to indicate the data block is unused (reference operation 1112, FIG. 11).

At operation 1206, page swapper 732 can determine whether the target page frame that was read in from the swap file is encrypted or not. In some embodiments, for example, the encrypted bit in the accessed map entry can indicate whether the target page frame is encrypted or not. If the encrypted bit indicates the target page frame is encrypted, processing can proceed to operation 1208. Otherwise, the target page frame can be deemed not to have been processed by swap file encrypter 734 and is in unencrypted form; processing can proceed to operation 1210.

At operation 1208, page swapper 732 can decrypt the target page frame that was read in at operation 1204 to produce an unencrypted page frame.

At operation 1210, page swapper 732 can store the unencrypted page frame into one of the pages in the host physical memory 712. The page swapper can update the map entry to clear the swapped bit to indicate that the target page frame is no longer swapped out (reference operations 1110, 1112, FIG. 11), thus completing swapping in a target memory page from swap file 742. Processing can return to operation 1204 to process the next target memory page; otherwise, processing of the current page fault by the page swapper 732 can be deemed complete.

Figure 13:
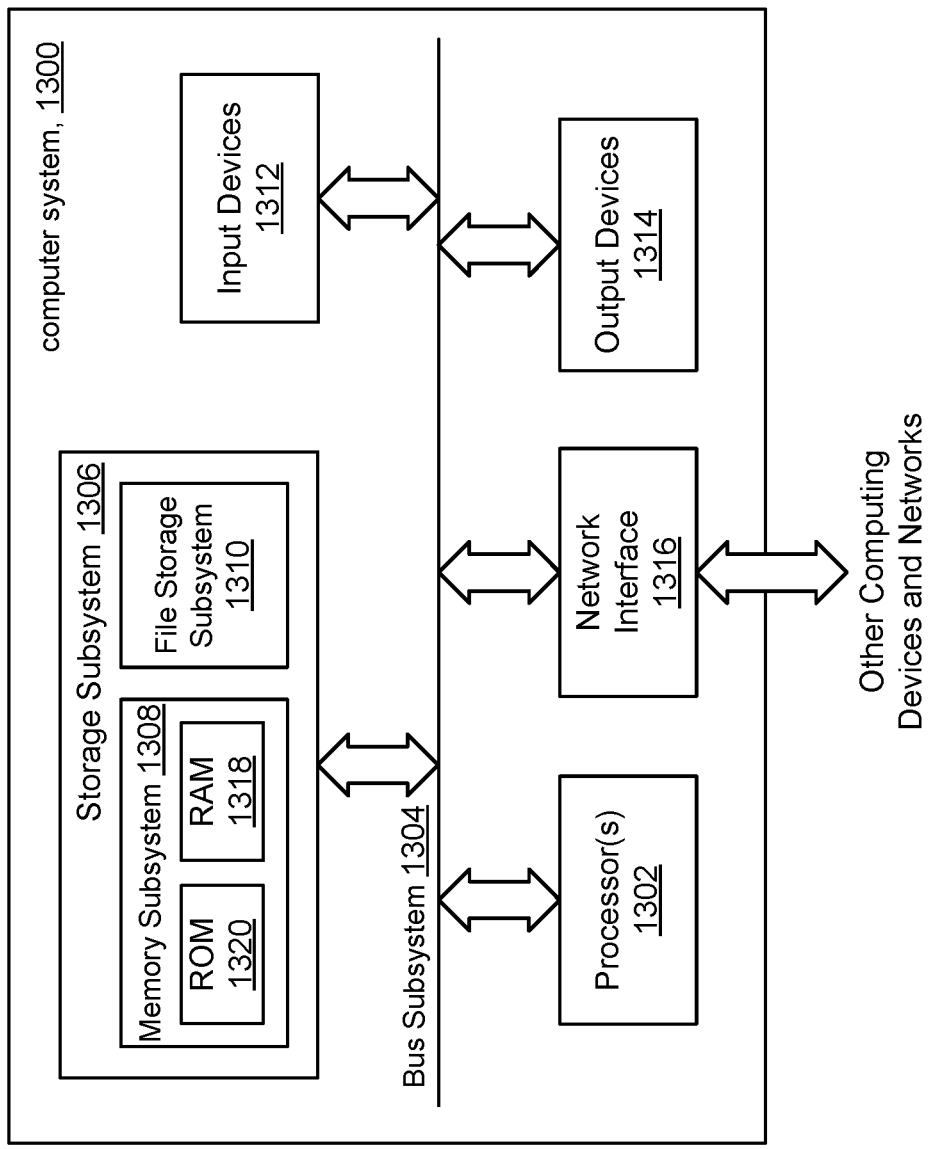
FIG. 13 illustrates a computer system adaptable in accordance with embodiments in accordance with the present disclosure.

FIG. 13 depicts a simplified block diagram of an example computer system 1300 according to certain embodiments. Computer system 1300 can be used to implement host machine 100, computer system 200, and host machine 702 described in the present disclosure. As shown in FIG. 13, computer system 1300 includes one or more processors 1302 that communicate with a number of peripheral devices via bus subsystem 1304. These peripheral devices include storage subsystem 1306 (comprising memory subsystem 1308 and file storage subsystem 1310), user interface input devices 1312, user interface output devices 1314, and network interface sub system 1316.

Bus subsystem 1304 can provide a mechanism for letting the various components and subsystems of computer system 1300 communicate with each other as intended. Although bus subsystem 1304 is shown schematically as a single bus, alternative embodiments of the bus subsystem can utilize multiple busses.

Network interface subsystem 1316 can serve as an interface for communicating data between computer system 1300 and other computer systems or networks (e.g., storage system 104). Embodiments of network interface subsystem 1316 can include, e.g., an Ethernet card, a Wi-Fi and/or cellular adapter, a modem (telephone, satellite, cable, ISDN, etc.), digital subscriber line (DSL) units, and/or the like.

User interface input devices 1312 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1300.

User interface output devices 1314 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1300.

Memory subsystem 1306 includes memory subsystem 1308 and file/disk storage subsystem 1310 represent non-transitory computer-readable storage media that can store program code and/or data, which when executed by processor 1302, can cause processor 1302 to perform operations in accordance with embodiments of the present disclosure.

Memory subsystem 1308 includes a number of memories including main random access memory (RAM) 1318 for storage of instructions and data during program execution and read-only memory (ROM) 1320 in which fixed instructions are stored. File storage subsystem 1310 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1300 is illustrative and many other configurations having more or fewer components than system 1300 are possible.

CONCLUSION

In accordance with the present disclosure, encryption processing by disk encrypter 122 can take place as a background process. This allows the virtual disk 14 to be encrypted based on availability of the host machine processing resources. For example, the encryption process can be a lower priority activity as compared to executing the VMs 12. Processing resources can be shifted away from disk encrypter 122 to the VMs 12 when the processing load in the VMs increases, and then returned to disk encrypter 122 when processing load lets up.

Operating as a background process allows a virtual disk to be encrypted while the VM is powered on. Being able to stay powered on can be significant in legacy systems where the virtual disk is already loaded with data. It can be highly disruptive to power down a VM for the purpose of encrypting the virtual disk. The disruption can exacerbated if the virtual disk is very large (e.g. terabytes of storage) and the VM has to be powered down for a significant amount of time in order to encrypt the virtual disk. Encryption processing in accordance with the present disclosure allows the virtual disk to be encrypted as a background process (disk encrypter 122) on a powered-on VM, allowing for the VM to do work and allowing the VM to access the virtual disk concurrently with but independently of the encryption process.

In addition, I/O filter 124 allows for the data state of the virtual disk to include encrypted and decrypted data without requiring the guest OS to track the data state. The actual encrypted/decrypted data state of the virtual disk is therefore transparent to the guest OS. The guest OS reads unencrypted data from the virtual disk and writes unencrypted data to the virtual disk. The encryption is guest-agnostic; guest OS is not even aware the encryption is happening and thus requires no coordination by the guest OS when issuing I/O requests to the virtual disk.

In accordance with the present disclosure, disk encrypter 122 performs in-place encryption where the encryption of virtual disk 14 takes place N-blocks at a time (FIG. 5). By comparison, encrypting the entire virtual disk all at once requires enough space to contain the entirety of the encrypted virtual disk; in other words a second virtual (or physical) disk. This can be impractical when the virtual disk is large; e.g., virtual disks can be configured for many terabytes of data storage. Encrypting only N-blocks at a time requires an insignificant of storage by comparison.

In accordance with the present disclosure, swap file encrypter 734 can take place as a background process separate from the activities of the page swapper 732. As such, the swap file encrypter 734 can be lower or higher priority process depending on other activity in the host machine. This allows for page swapping activity to proceed relatively unimpeded, while at the same timer receiving the benefit of having an encrypted swap file, namely to prevent malicious or otherwise unauthorized probing of the VM execution state.

The page swapper 732 allows for the data state of the swap file to include encrypted and decrypted data without requiring the guest OS to track the data state when pages of guest physical memory are swapped in and out. The actual encrypted/decrypted data state of the swap file is therefore transparent to the guest OS. The guest OS writes and reads unencrypted data to and from the guest physical memory.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
performing, by a computing system, swapping operations to swap in and swap out pages of memory between a main memory of the computer system and a swap file in response to occurrence of page faults; and
performing, by the computing system, an encryption operation that includes encrypting each page of memory that is stored in the swap file and updating information associated with said each page of memory to indicate said each page of memory is encrypted, the encryption operation being performed independently of the occurrence of the page faults and without coordination with the swapping operations,
wherein a swapping operation on a page of memory to be swapped includes encrypting or decrypting the page of memory depending on whether the swapping operation is a swap-in operation or a swap-out operation and depending on whether information associated the page of memory indicates the page of memory is encrypted or not encrypted.

2. The method of claim 1, wherein the encryption operation comprises:
accessing a page map to identify a page of memory that is stored in the swap file, the page map including information that indicates where the page of memory is located in the swap file;
accessing the page of memory from the swap file;
encrypting the accessed page of memory and storing the encrypted page of memory back in the swap file;
updating the page map with information to indicate that the page of memory is encrypted; and
repeating with a next page of memory.

3. The method of claim 2, wherein the encryption operation further comprises accessing the page map in sequential order starting from a first page of memory in the page map and proceeding toward a last page of memory in the page map.

4. The method of claim 1, wherein the swapping operation is a swap-out operation, the method further comprising encrypting the page of memory to be swapped when the information in the page map associated the page of memory indicates the page of memory is not encrypted.

5. The method of claim 1, wherein the swapping operation is a swap-in operation, the method further comprising reading in the page of memory to be swapped and decrypting the page of memory when the information in the page map associated the page of memory indicates the page of memory is encrypted.

6. The method of claim 1, wherein the computing system is a host machine of a virtualization system and the host physical memory is host physical memory of the host machine, wherein the pages of memory stored in the swap file are pages of guest physical memory of a virtual machine (VM) instantiated in the virtualization system, wherein the pages of the guest physical memory are backed by a pages of the host physical memory.

7. A non-transitory computer-readable storage medium having stored thereon computer executable instructions, which when executed by a computer device, cause the computer device to:
perform swapping operations to swap in and swap out pages of memory between a main memory of the computer system and a swap file in response to occurrence of page faults; and
perform an encryption operation that includes encrypting each page of memory that is stored in the swap file and updating information associated with said each page of memory to indicate said each page of memory is encrypted, the encryption operation being performed independently of the occurrence of the page faults and without coordination with the swapping operations,
wherein a swapping operation on a page of memory to be swapped includes encrypting or decrypting the page of memory depending on whether the swapping operation is a swap-in operation or a swap-out operation and depending on whether information associated the page of memory indicates the page of memory is encrypted or not encrypted.

8. The non-transitory computer-readable storage medium of claim 7, wherein the encryption operation comprises:
accessing a page map to identify a page of memory that is stored in the swap file, the page map including information that indicates where the page of memory is located in the swap file;
accessing the page of memory from the swap file;
encrypting the accessed page of memory and storing the encrypted page of memory back in the swap file;
updating the page map with information to indicate that the page of memory is encrypted; and
repeating with a next page of memory.

9. The non-transitory computer-readable storage medium of claim 7, wherein the encryption operation further comprises accessing the page map in sequential order starting from a first page of memory in the page map and proceeding toward a last page of memory in the page map.

10. The non-transitory computer-readable storage medium of claim 7, wherein the swapping operation is a swap-out operation, the method further comprising encrypting the page of memory to be swapped when the information in the page map associated the page of memory indicates the page of memory is not encrypted.

11. The non-transitory computer-readable storage medium of claim 7, wherein the swapping operation is a swap-in operation, the method further comprising reading in the page of memory to be swapped and decrypting the page of memory when the information in the page map associated the page of memory indicates the page of memory is encrypted.

12. The non-transitory computer-readable storage medium of claim 7, wherein the computing system is a host machine of a virtualization system and the host physical memory is host physical memory of the host machine, wherein the pages of memory stored in the swap file are pages of guest physical memory of a virtual machine (VM) instantiated in the virtualization system, wherein the pages of the guest physical memory are backed by a pages of the host physical memory.

13. An apparatus comprising:
one or more computer processors; and
a computer-readable storage medium comprising instructions for controlling the one or more computer processors to be operable to:
perform swapping operations to swap in and swap out pages of memory between a main memory of the computer system and a swap file in response to occurrence of page faults; and
perform an encryption operation that includes encrypting each page of memory that is stored in the swap file and updating information associated with said each page of memory to indicate said each page of memory is encrypted, the encryption operation being performed independently of the occurrence of the page faults and without coordination with the swapping operations,
wherein a swapping operation on a page of memory to be swapped includes encrypting or decrypting the page of memory depending on whether the swapping operation is a swap-in operation or a swap-out operation and depending on whether information associated the page of memory indicates the page of memory is encrypted or not encrypted.

14. The apparatus of claim 13, wherein the encryption operation comprises:
accessing a page map to identify a page of memory that is stored in the swap file, the page map including information that indicates where the page of memory is located in the swap file;
accessing the page of memory from the swap file;
encrypting the accessed page of memory and storing the encrypted page of memory back in the swap file;
updating the page map with information to indicate that the page of memory is encrypted; and
repeating with a next page of memory.

15. The apparatus of claim 13, wherein the encryption operation further comprises accessing the page map in sequential order starting from a first page of memory in the page map and proceeding toward a last page of memory in the page map.

16. The apparatus of claim 13, wherein the swapping operation is a swap-out operation, the method further comprising encrypting the page of memory to be swapped when the information in the page map associated the page of memory indicates the page of memory is not encrypted.

17. The apparatus of claim 13, wherein the swapping operation is a swap-in operation, the method further comprising reading in the page of memory to be swapped and decrypting the page of memory when the information in the page map associated the page of memory indicates the page of memory is encrypted.

18. The apparatus of claim 13, wherein the computing system is a host machine of a virtualization system and the host physical memory is host physical memory of the host machine, wherein the pages of memory stored in the swap file are pages of guest physical memory of a virtual machine (VM) instantiated in the virtualization system, wherein the pages of the guest physical memory are backed by a pages of the host physical memory.

* * * * *